United States Patent Office 2,917,480
Patented Dec. 15, 1959

2,917,480

SILOXANE OXYALKYLENE BLOCK COPOLYMERS

Donald L. Bailey, Snyder, and Francis M. O'Connor, Kenmore, N.Y., assignors to Union Carbide Corporation, a corporation of New York No Drawing. Application June 10, 1954
Serial No. 435,938

30 Claims. (Cl. 260—42)

This invention relates generally to organo-silicone compounds and to processes for making them. More particularly, it is concerned with organo-silicon compounds to which the name block copolymer is applied in that it has at least one block or section to the molecule thereof which is a silicone polymer and at least one block or section which is an organic polymer. Without regard to a particular structure or configuration of the molecule, the relative number of blocks of silicone polymer and of blocks of organic polymer present therein, can be illustrated graphically as follows:

$$(W)_m(Z)_n$$

in which W represents a silicone polymer and Z represents an organic polymer, and $m$ and $n$ each are integers whose sum is two or three.

The silicone block is a siloxane linear polymer or chain of recurring siloxane units which can be represented by the general formula $$-(R_2SiO)_y-$$

in which R is a hydrocarbyl group and $y$ is an integer which is at least 2. By the term hydrocarbyl group is meant a monovalent group composed of carbon and hydrogen of which the aliphatic and aromatic groups are illustrative. Representative of the aliphatic group are the radicals, methyl, ethyl, vinyl, propyl, isopropyl, the butyls, the pentyls and the hexyls. Representative of the aromatic groups are the aryl radicals, such as phenyl, the methyl phenyls and the ethyl phenyls and the aralkyl radicals, such as benzyl. Thus a silicone block of two units in which the hydrocarbyl groups are methyl, $$-Me_2SiO-Me_2SiO-$$

has a molecular weight of 148 which is the minimum molecular weight attributable to the silicone block of the compositions of the present invention. Silicone blocks having weights as high as 50,000 or higher, can be used but those having a molecular weight of from 500 to 10,000 attributable to the polysiloxane chain are preferred. Furthermore, in compositions wherein the molecular weight attributable to the silicone block is 162 or more, the hydrocarbyl groups need not be the same throughout the silicone block but may differ from unit to unit or be different within a single silicone unit.

The organic block of our composition is a linear, predominantly oxyalkylene polymer or chain comprised for the most part of recurring oxyalkylene groups, which groups can be represented by the general formula $$(C_nH_{2n}O)_x$$

in which $n$ is an integer from 2 to 4 and $x$ is an integer which is at least 5. Thus, a polyoxyalkylene block of five units in which $n$ is 2 throughout the chain or block has a molecular weight of 220 which is the minimum molecular weight attributable to the block. Organic blocks of a molecular weight up to about 10,000 or higher can be used. A molecular weight from about 500 to 6000 is preferred, however. The oxyalkylene group need not be the same throughout the organic chain or block which can comprise oxyalkylene groups of differing molecular weights such as oxyethylene; oxy-1,2-propylene; oxy-1,3-propylene and the oxybutylenes.

Thus the general formula of the block copolymers of this invention is as follows:

$$R'[R_2SiO)_y]_a[(C_nH_{2n}O)_x]_bR'' \quad (A)$$

where $y$ is an integer having a value of at least 2 and denotes the number of siloxane units, $n$ is an integer from 2 to 4 denoting the number of carbon atoms in the oxyalkylene group, $x$ is an integer having a value of at least 5 and denotes the length of the oxyalkylene chain, and $a$ and $b$ are integers whose sum is 2 or 3. R' and R" are chain-terminating monovalent hydrocarbyl or hydrocarbyloxy radicals, and may terminate a siloxane chain either by a hydrocarbyloxy group or by completing a trihydrocarbylsilyl group and may terminate an oxyalkylene chain with a hydrocarbyloxy group. It will be understood further that the compositions of matter are mixtures of such block copolymers wherein $x$ and $y$ are of different values and that methods of determining the chain length of the polysiloxane chains and the polyoxyalkylene chains give values which represent average chain lengths.

With reference to Formula A above, it will be noted that there is at least one oxyalkylene chain or block joined to at least one siloxane chain or block through a Si—O—C bond, and different types of block copolymers are formed depending on the values of $a$ and $b$.

In one type there is one block of siloxane polymer ($a$ is 1) and two blocks of oxyalkylene polymer ($b$ is 2) and such type may be represented as follows:

$$R'O(C_nH_{2n}O)_x(R_2SiO)_y(C_nH_{2n}O)_xR'' \quad (I)$$

where the subscripts are as defined in Formula A above and R' and R" are hydrocarbyl radicals.

In another type of block copolymer, there is one block of oxyalkylene polymer ($b$ is 1) and two blocks of siloxane polymer ($a$ is 2) and this type may be represented as follows:

$$R'(R_2SiO)_y(C_nH_{2n}O)_x(R_2SiO)_{y-1}R_2SiR'' \quad (II)$$

where R' and R" are hydrocarbyl or hydrocarbyloxy radicals, and the other subscripts are as defined for Formula A.

In a third type of block copolymer, there is one block of a siloxane polymer and one block of an oxyalkylene polymer ($a$ and $b$ both equal 1), and this type may be represented as follows:

$$R'(R_2SiO)_y(C_nH_{2n}O)_xR'' \quad (III)$$

where R' and R" are hydrocarbyl or hydrocarbyloxy radicals.

In general, these block copolymers may be formed by reacting an alkoxy end-blocked linear dihydrocarbylsiloxane polymer with a polyoxyalkylene mono-ol or diol, with the elimination of a molecule of an alkanol for each hydroxyl group of the polyoxyalkylene hydroxyl compound reacted, and the attachment of a block of the oxyalkylene polymer to a block of siloxane polymer through a Si—O—C bond for each molecule of alkanol removed.

Thus block copolymers of type I may be formed by reacting two moles of a polyoxyalkylene monohydroxyl compound with one mole of a linear dialkoxy end-blocked polysiloxane with the elimination of two molecules of an alkanol as follows:

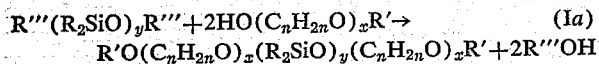

where R and R' are hydrocarbyl groups and R''' is an alkyl group.

Block copolymers of type II may be formed by two methods. According to one method, one mole of a polyoxyalkylene diol is reacted with two moles of a linear monoalkoxy end-blocked polysiloxane as follows:

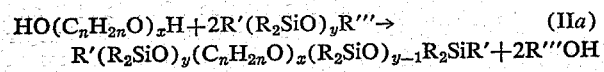

where R and R' are hydrocarbyl groups and R''' is an alkyl radical.

According to another method, block copolymers of type II are formed by reacting two moles of a linear dialkoxy end-blocked polysiloxane with one mole of a polyoxyalkylene diol as follows:

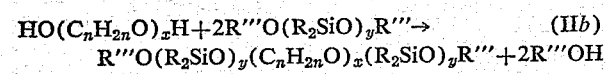

where R''' is an alkyl radical and R is a hydrocarbyl radical.

Block copolymers of type III can be formed by reacting one mole of a polyoxyalkylene monohydroxyl compound with one mole of a linear monoalkoxy end-blocked polysiloxane as follows:

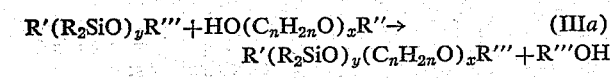

where R' and R'' are hydrocarbyl radicals, and R''' is an alkyl radical.

According to a second method, block copolymers of type III are formed by reacting one mole of a linear dialkoxy end-blocked polysiloxane with one mole of a polyoxyalkylene monohydroxyl compound as follows:

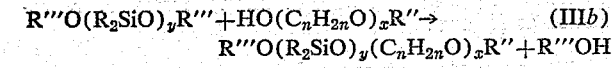

where R and R'' are hydrocarbyl radicals and R''' is an alkyl radical.

The monoalkoxy and dialkoxy end-blocked linear polysiloxanes which are reactants or starting materials for the production of our block copolymers can themselves be made by reacting a lower molecular weight polysiloxane with a mono- or dialkoxysilane. More specifically, as described in the copending application of D. L. Bailey, Serial No. 398,225, filed December 14, 1953, a trimeric cyclic siloxane $(R_2SiO)_3$ or a tetrameric cyclic siloxane $(R_2SiO)_4$ can be equilibrated with a dihydrocarbyl dialkoxysiloxane or a trihydrocarbyl monoalkoxysilane in the presence of an alkaline catalyst to produce respectively dialkoxy end-blocked and monoalkoxy end-blocked linear polysiloxanes. The molecular weight of the resultant linear polysiloxane is dependent upon the charging ratios employed. The higher the proportion of cyclic trimer or tetramer to the alkoxysilane, the higher the molecular weight of the alkoxypolysiloxane. Thus, alkoxypolysiloxanes may be formed having molecular weights from about 300 to 10,000 and upwards.

The monohydroxy polyoxyalkylene mono-ethers employed in the reaction to form the block copolymers must possess a definite chain length to be effective for the purpose of this invention. Such chain length is herein defined as a minimum of five oxyalkylene groups which is the chain length found necessary to exert a significant effect on such properties as solubility and lubricity of the block copolymers. The specific effect contributed by the polyoxyalkylene chain will vary with the type of oxyalkylene group making up the chain. Thus polysiloxane-polyoxyalkylene block copolymers in which the oxyalkylene groups are composed of oxypropylene groups are water-insoluble, whereas the molecules may be water-soluble when the oxyalkylene group is oxyethylene, depending on the polysiloxane-polyoxyethylene ratio. The polyoxyalkylene block copolymers will vary in solubility from water-soluble to water-insoluble when the polyoxyalkylene chain is composed of both oxyethylene and oxypropylene groups depending on their ratio, and on the polysiloxane-polyoxyethylene ratio.

Monohydroxy polyoxypropylene monoethers suitable for the practice of the invention are described in Fife and Roberts U.S. Patent No. 2,448,664.

Also, monohydroxy oxyethylene-oxy-1,2-propylene monoethers having both oxyethylene and oxypropylene groups in the molecule are described in Roberts and Fife U.S. Patent No. 2,425,755. In addition, polyoxyalkylene monoethers containing both oxyethylene and oxypropylene groups in the molecule may be formed by the sequential addition of ethylene oxide and propylene oxide to a monohydric alcohol to form oxyalkylene chains composed of a sequence of oxyethylene groups followed by a sequence of oxypropylene groups or vice versa.

The polyoxyalkylene diols employed in forming block copolymers of type II are the well known polyoxyethylene glycols, polyoxypropylene glycols and polyoxybutylene glycols as well as the polyoxyethylene-polyoxypropylene diols described in Toussaint and Fife U.S. Patent No. 2,425,845. Other oxyalkylene diols may be formed by the addition of ethylene oxide to polyoxypropylene glycol or of propylene oxide to polyoxyethylene glycols.

It is also well known that polyoxyalkylene mono-ol polymers can be made by reacting alkylene oxides with other compounds having a labile hydrogen atom. Examples of such compounds are alkyl and aryl mercaptans, such as ethyl and butyl mercaptans and alkyl and aryl amines, such as mono-butyl and dibutylamine and aniline. Such polyoxyalkylene polymers made from such diverse starting materials also form block copolymers of the same general type with polysiloxane polymers as the starting fragment of the polyoxyalkylene polymer forms an insignificant fraction of the block copolymer.

The condensation reactions depicted in the above Equations Ia, IIa, IIb, IIIa, IIIb for forming the block copolymer are essentially reversible reaction and are dependent upon the removal of alcoholic products, generally designated as R'''OH, from the reaction mixtures in order to force said reactions towards completion. It is apparent, furthermore, that the ultimate quantity of the alcoholic product (R'''OH) removed from each reaction mixture provides an indication of the extent to which that particular condensation reaction between the alkoxy polysiloxane and the polyoxyalkylene glycols or monoether reactants has reached completion.

The rate at which the alcoholic product is removed from the reaction mixture additionally serves to indicate the rate at which the reaction is progressing. That is, if a large quantity of alcoholic product is removed within a short period of reaction time, it may be concluded that the reaction is proceeding at a rapid rate, whereas the reaction is proceeding at a slow rate if the amount of alcoholic product removed in the given time is small.

The alkoxy end-blocked polysiloxanes are usually incompatible with polyoxyalkylene glycols or their monoethers and difficulties arise in bringing the two substances in reactive contact. These difficulties, however, are resolved by carrying out the condensation reaction in a suitable solvent, such as, for example, toluene or xylene, in which the reacting substances are mutually soluble and, thus, brought into intimate contact. The reaction temperature is, therefore, limited by the reflux temperature of the polysiloxane-polyoxyalkylene mono-ol or diol solution and a higher boiling solvent will permit a higher reaction temperature. Although the type of solvent is critical to the success of the condensation reaction only insofar as the starting materials must be mutually soluble therein, it is also necessary that the amount of said solvent be sufficient to provide a homogeneous solution of the starting materials at the reaction temperature, i.e. the reflux temperature of the solution. In instances where a large molecular weight polyoxyalkylene mono-ol or diol is employed as a starting material, complete compatibility despite the use of a mutual solvent is not readily attainable. The reaction in these instances progresses but at a much slower rate.

Although the use of toluene and xylene as mutual solvents for the reaction mixture of this invention provide a high enough reflux temperature to carry out the condensation reaction to completion, toluene in certain instances, is to be preferred for practical reasons over xylene. It has been found that on infrequent occasions the higher reflux temperature provided by xylene solvent encourages undesirable side reactions producing water instead of the expected alcoholic product. This difficulty has been overcome by the use of a toluene solvent which provides a lower reflux temperature and, thus, eliminates or lessens the tendency towards side reactions. When toluene is used as a solvent the alcoholic product, resulting from the condensation reaction is removed as an azeotrope with toluene.

The catalysts employed in the condensation reactions are, in general, the organic acids, including trifluoroacetic acid, perfluorobutyric acid, perfluoroglutaric acid, monochloroacetic acid, acetic acid, etc. or alkaline substances, such as potassium silanolate, $KO(SiR_2O)_bK$, wherein $b$ is a positive integer and R is an alkyl radical such as ethyl or methyl. The organic acid catalysts are active with most starting materials, and are effective at low concentrations, e.g. as low as 0.1 percent by weight of the starting materials. They produce colorless to light-colored block copolymers and do not cause any degradation of the polysiloxane molecules to result in copolymer products which are low in silicon content as is the tendency of strong acid catalysts and alkaline catalysts. Of the organic acid catalysts, trifluoroacetic acid, perfluorobutyric acid, and perfluoroglutaric acid provide exceptionally high catalytic activities and, therefore, are to be preferred.

The alkaline catalysts, in particular potassium silanolate containing about 3.0 percent by weight of potassium, exhibit very high catalytic activity. The use of alkaline catalysts, tends to cause the degradation of the polysiloxane chain during the condensation reaction to produce the corresponding cyclic polysiloxanes and organosilicone products which are low in silicon content. The degradation reaction is of the reversible type and may be opposed by the addition to the initial reaction mixture of the cyclic polysiloxane expected to be produced by the degradation process brought about under the influence of the alkaline catalyst. For example, in preparing dimethylpolysiloxane-polyoxyalkylene glycol monoether block copolymers with potassium silanolate as a catalyst the addition of appreciable amounts of the cyclic tetramer of dimethylsiloxane prevented any alkaline catalyst caused degradation and resulted in products which had the theoretical silicon content for the particular block copolymer formed.

While neutral and mildly basic aqueous solutions of the water-soluble types of polysiloxane-polyoxyalkylene block copolymers of this invention are stable against hydrolysis and remain clear and homogeneous for extremely long periods of time, strong acids and bases added to or initially present in and unremoved from these solutions tend to attack the hydrolyzable Si—O—C bonds present in the molecules of said compounds to bring about the hydrolysis of said polysiloxane-polyoxyalkylene block copolymers within a short time. The addition of trifluoroacetic acid, for example, to an aqueous solution of water-soluble polysiloxane-polyoxyalkylene block copolymers caused these solutions to become turbid within several minutes and separate into polyoxyalkylene glycol monoether aqueous layer and a silicone oil or polysiloxane layer. The removal or neutralization of the acid catalyst employed in the condensation reaction, therefore, may be desirable to provide a hydrolytically stable polysiloxane-polyoxyalkylene glycol monoether block copolymer.

The neutralization of the acid catalyst with stoichiometric amounts of a weak organic base, e.g., triethanolamine, monoethanolamine, monoisopropanolamine, dibutyl amine, etc., or sodium bicarbonate, anhydrous ammonia, etc., is to be preferred over the removal of the catalyst, as by washing with water, and subsequent treatment with adsorption material such as silica gel or "Magnesol," inasmuch as the latter process results only in an incomplete removal of the residual acid catalyst.

A unique property of some of the block copolymers is their water-solubility, and block copolymers having that fraction of their molecular weight which is attributable to the oxyethylene groups approximately equal to or greater than those fractions which are attributable to either the polysiloxane units or to oxypropylene or oxybutylene units are water-soluble. The water-soluble block copolymers are very useful as antifoam agents and as rubber lubricants, particularly for tire molds, where their water-solubility permits them to be readily applied from an aqueous solution or emulsion, and any excess lubricant to be readily removed from the molded article by washing. Such property of ready removal by washing also adapts them for use as textile lubricants.

The water-soluble block copolymers are also miscible with water-soluble polyoxyethylene-polyoxypropylene diols, monoethers and diethers and form useful lubricants and hydraulic fluids in combination therewith. By themselves, or in combination with the above diols, monoethers and diethers, or with ethylene glycol or propylene glycol, the water-soluble block copolymers form useful ingredients of lubricants having a water base, commonly termed hydrolubes. As the alkoxy polysiloxanes are themselves water-insoluble and immiscible with the above mentioned materials, it is apparent that the block copolymers have greatly enhanced utility.

Block copolymers wherein the polyoxyalkylene block contains few or no oxyethylene units are not water-soluble, but they are miscible with the starting monohydroxy polyoxyalkylene monoethers, or the corresponding diols or diethers, and form useful lubricating compositions in combination therewith.

A truly remarkable property of certain of the block copolymers is their load-carrying capacity as metal-to-metal lubricants for moving surfaces. Silicone fluids, such as dimethylsilicone oils, are very poor lubricants for such service, having practically no load-carrying capacity. However, it has been found that the block copolymers, whose polysiloxane content corresponds to a silicon content of between 2% and 20% Si are excellent metal-to-metal lubricants and have better load-carrying capacity than the polyoxyalkylene fluids.

The lubricating properties of some of the block copolymers, as compared to silicone oils, petroleum oils and polyoxyalkylene fluids, is given in the table below:

TABLE I
*Lubricating properties of block copolymers and other fluids*

| Fluid No. | Calc., Percent Si | Viscosities, Cs. | | A.S.T.M. Slope | S.A.E. Test Load in Lbs. at 475 r.p.m. | Falex Seizure Test Jaw Load, Lbs. |
|---|---|---|---|---|---|---|
| | | 100° F. | 210° F. | | | |
| Silicone Oils: | | | | | | |
| 1 | 38 | 270 | 118 | .176 | | 0 |
| 2 | 38 | 80 | 32.5 | .249 | | 0 |
| Petroleum Oil: | | | | | | |
| 3 | 0 | 40 | | | 85 | |
| Oxyalkylene Fluids: | | | | | | |
| 4 | 0 | 86.6 | 16.7 | .54 | | 1,000 |
| 5 | 0 | 61.7 | 11.0 | .57 | 100 | 500 |
| Block Copolymers: | | | | | | |
| 6 | 25 | 74.1 | 20.3 | .38 | | 0 |
| 7 | 16.5 | 52.8 | 14.9 | .42 | 170 | |
| 8 | 17.3 | 80.5 | 19.0 | .42 | | 600 |
| 9 | 8.9 | 65.9 | 15.4 | .46 | 300 | |
| 10 | 8.0 | 60.4 | 14.0 | .48 | 370 | |
| 11 | 4.1 | 50.0 | 11.1 | .52 | 450+ | |
| 12 | 16.1 | 19.7 | 6 | .51 | | 600 |
| 13 | 10.0 | 48.1 | 11.9 | 0.47 | | 1,250 |
| 14 | 8.9 | 56.4 | 13.0 | 0.47 | | 1,750 |

The identification of the fluids referred to in Table I is as follows:

Silicone oils:
1. Dimethyl silicone oils having a viscosity of 350 cs. at 25° C.
2. Dimethyl silicone oil having a viscosity of 100 cs. at 25° C.

Petroleum oils:
3. Naphthenic base petroleum motor oil.

Oxyalkylene fluids:
4. Reaction product of butanol with a 50–50 by weight mixture of ethylene oxide and propylene oxide, average molecular weight 1350.
5. Monobutyl ether of polyoxypropylene diol, average molecular weight 1000.

Block copolymers:
6. Example VIII.
7. Product of reaction of 2 moles of the monobutyl ether of polypropylene glycol (M.W. 625) with one mole of diethoxy end-blocked linear polydimethylsiloxane.
8. Example VII.
9. Product of reaction of 2 moles of the monobutyl ether of polypropylene glycol (M.W. 734) with one mole of diethoxy end-blocked linear polydimethylsiloxane (M.W. 518).
10. Example VI.
11. Example V.
12. Example IV.
13. Product of reaction of 2 moles of monobutyl ether of polypropylene glycol (M.W. 625) with one mole of diethoxy end-blocked linear polydimethylsiloxane (M.W. 518).
14. Product of reaction of 2 moles of the monobutyl ether of polypropylene glycol (M.W. 734) with one mole of diethoxy end-blocked linear polydimethylsiloxane (M.W. 518).

The block copolymers of this invention differ from other types of copolymers in that the molecular weights of the polysiloxane block and of the polyoxyalkylene block can be predetermined and controlled. This, coupled with the fact that the block copolymers may contain from one to two polysiloxane blocks in combination with from one to two polyoxyalkylene blocks, makes possible block copolymers which differ widely in composition. Thus, the block copolymers may have a short, medium or long polysiloxane block in combination with one or two, short, medium or long blocks of oxyalkylene units. A few of the many possible combinations are shown in the table below:

TABLE II
*Average molecular weight of block copolymers*

| Ratio of Oxyalkylene to Polysiloxane Blocks | 1:1 | 1:2 | 2:1 | 1:1 | 1:2 | 2:1 | 1:1 | 1:2 | 2:1 |
|---|---|---|---|---|---|---|---|---|---|
| Av. Molecular Weight of Oxyalkylene Block | 500 | 500 | 500 | 2,500 | 2,500 | 2,500 | 5,000 | 5,000 | 5,000 |
| Av. Molecular Weight of Polysiloxane Block: | | | | | | | | | |
| 500 | 1,000 | 1,500 | 1,500 | 3,000 | 3,500 | 5,500 | 5,500 | 6,000 | 10,500 |
| 2,500 | 3,000 | 5,500 | 3,500 | 5,000 | 7,500 | 7,500 | 7,500 | 10,000 | 12,500 |
| 5,000 | 5,500 | 10,500 | 6,000 | 7,500 | 12,500 | 10,000 | 10,000 | 15,000 | 15,000 |

The block copolymers of polysiloxane blocks and polyoxyalkylene blocks thus form useful compositions over a wide range of polysiloxane content, including a polysiloxane content from 5% to 95% by weight of the block copolymer. Within this range, wherein the polysiloxane content, calculated as percent silicon, is between 2 and 20%, the products are excellent lubricants as previously stated. Within the range of 15% to 50% polysiloxane, the block copolymers form useful water-soluble and solvent-soluble fluids. And at higher polysiloxane contents between 50% and 95% the block copolymers are oils having exceptionally low pour points, and suitable as hydraulic fluids.

As illustrations of the various types of block copolymers which are obtainable in accordance with the teachings of this invention, the following general description and specific examples of block copolymers prepared from polysiloxanes and particular polyoxyalkylene glycol monoethers are presented.

ALKOXYPOLYOXYETHYLENE-POLYSILOXANE BLOCK COPOLYMERS

High molecular weight mixtures of monoethers of polyoxyethylene glycols, may be obtained by the addition of ethylene oxide to a monohydroxy compound, such as methyl alcohol, ethyl alcohol, butyl alcohol, octanol, benzyl alcohol, butyl and octyl phenol, etc. Depending to some extent upon the particular monohydroxy alcohol which is the starting material and the average molecular weight of the addition product, the properties of said product do not differ greatly from those of polyoxyethylene glycols of corresponding average molecular weights. The longer the polyoxyethylene chain of the polyoxyethylene glycol monoether, i.e., the higher its molecular weight, the less appears to be the influence of the starting monohydroxy alcohol on such properties; for example, polyoxyethylene glycol monoether addition products made from water-insoluble monohydroxy alcohols as starting materials become more water-soluble with increasing average molecular weight of the polyoxyethylene chain.

Alkoxy polyoxyethylene glycols range in average molecular weights as high as 6000 to 7000 and higher. Their average molecular weights are normally determined from acetyl values, although other methods of calculation, such as from ebullioscopic data or viscosity data, may be used.

At normal room temperatures, the alkoxy polyoxyethylene glycols having average molecular weights of about 600 to 800 are, in general, semi-fluid, pasty masses. Below this range of average molecular weights the alkoxypolyoxyethylene glycols are clear, colorless, normally-liquid compositions which are miscible in water in substantially all proportions. At and above an average molecular weight range of about 800 to 900, the alkoxypolyoxyethylene glycols are low melting, normally-solid compositions which are miscible with water in substantially all proportions.

Alkoxypolyoxyethylene glycol compositions of all average molecular weights have extremely low vapor pressures and hence are slightly volatile. They are compatible with hydrocarbons, particularly the aromatic hydrocarbons to an even greater extent than related polyoxyethylene glycols largely due to the presence of alkoxy groups on the polyoxyalkylene chain.

The alkoxypolyoxyethylene glycol molecule is particularly characterized by one hydroxyl group which may be readily reacted. When dissolved with alkoxy end-blocked polysiloxanes in a suitable solvent, e.g. toluene, xylene, etc., and heated in the presence of a suitable catalyst, such as, an organic acid or an alkaline substance, they condense with said polysiloxanes to form block copolymers constituted by molecules having one or two alkoxy polyoxyethylene glycol chains connected to each polysiloxane chain depending upon the molar ratio of alkoxypolyoxyethylene glycol to polysiloxane employed in the initial reaction mixture.

The block copolymers of this invention containing polyoxyethylene blocks range from viscous liquids to wax-like solids and from water-insoluble compositions to water-soluble compositions. For example, a block copolymer, prepared by the condensation of diethoxy polydimethylsiloxane having an average molecular weight of 1534 with monohydroxy polyoxyethylene methyl ether having an average molecular weight of 750 in a one to two molar ratio, is water-soluble, whereas a block copolymer in the same ratio prepared by condensing a diethoxy polydimethylsiloxane having a higher average molecular weight of 4070 with a monohydroxy polyoxyethylene methyl ether of average molecular weight 750, is water insoluble.

The following specific examples represent typical organosilicone compounds that may be prepared in accordance with this invention and serve to further illustrate the invention. In the following examples, the average molecular weights of the alkoxypolyethylene glycols represented are those determined from acetyl values and those of the alkoxy polysiloxanes were determined from charging ratios used in the preparation of said alkoxy polysiloxanes or from cryoscopic values of said polysiloxanes in cyclohexane.

EXAMPLE I

*Block copolymer from a diethoxy polysiloxane (av. M.W. 1036) and a polyoxyethylene diol monomethyl ether (av. M.W. 750)*

In a two-liter flask connected to a fractionating column there were placed 300 grams (0.4 mole) of polyoxyethylene diol monomethyl ether which was a soft solid having an average molecular weight of 750, 207.2 grams (0.2 mole) of a liquid polydimethylsiloxane with an average of two ethoxy groups per molecule and having an average molecular weight of 1036, 600 grams of toluene and one gram of trifluoroacetic acid as catalyst. The mixture was heated at the reflux temperature (about 120° C.) for 4 hours during which time 27 grams of material having a boiling point of 78–80° C. were removed from the head of the column. This material when analyzed was found to contain 18.3 grams (0.4 mole) of ethanol. This indicated that two moles of the monoethyl ether reacted with one mole of the siloxane to form a bis (monomethyl-polyoxyethylene) polydimethylsiloxane block copolymer. After cooling the reaction mixture to room temperature, 1.1 grams of triethanolamine were added to neutralize the catalyst. Upon removal of the toluene solvent under reduced pressure, there was obtained 451 grams of the block copolymer which was a water-soluble low-melting soft solid which melts to an amber-colored viscous oil. It readily emulsified toluene and water.

EXAMPLE II

*Block copolymer from a dialkoxy polysiloxane (av. M.W. 2146) and a polyoxyethylene diol monomethyl ether (av. M.W. 750)*

In a one-liter flask connected to a fractionating column were placed 75 grams (0.1 mole) of polyoxyethylene diol monomethyl ether having an average molecular weight of 750, 107.3 grams (0.05 mole) of a liquid polydimethylsiloxane having an average of two ethoxy groups per molecule and having an average molecular weight of 2146, 0.2 gram of perfluorobutyric acid catalyst and 300 cubic centimeters of xylene. The mixture was heated to the reflux temperature (about 145° C.) for 2.5 hours during which time 4.5 grams (0.1 mole) of ethanol were removed at the head of the column along with a small amount of solvent. The reaction mixture was cooled and anhydrous ammonia bubbled through for 2 minutes to neutralize the acid catalyst. A mixture of the neutralized solution with water had a pH of 8 to 10. Upon removal of the xylene under reduced pressure there were obtained 170 grams of a block copolymer which was a water-soluble, low-melting soft solid having a reduced specific viscosity of 0.18. It possessed good emulsifying properties for toluene water mixtures.

$$\text{Reduced specific viscosity} = \frac{\frac{N_c}{N_o} - 1}{C}$$

Where $N_c$ is the solution viscosity in cp. at 20° C. $N_o$ is the solvent viscosity in cp. at 20° C. and $C$ is the concentration of copolymers in grams per 100 ml. of solution. One gram of copolymer in 100 ml. of toluene was used.

EXAMPLE III

*Block copolymer from a dialkoxy polysiloxane (av. M.W. 4070) and a polyoxyethylene diol monomethyl ether (av. M.W. 750)*

In a one-liter flask attached to a fractionating column there were placed 18.75 grams (0.025 mole) of a polyoxyethylene diol monomethyl ether having an average molecular weight of 750, 50.9 grams (0.0125 mole) of a diethoxy end-blocked polydimethylsiloxane having an average molecular weight of 4070, 0.1 gram of perfluorobutyric acid as a catalyst and 150 cubic centimeters of xylene. The mixture was heated to the reflux temperature (about 145° C.) for 3 hours during which time some solvent and low-boiling material identified as ethyl alcohol was removed at the head of the column. The solution was then cooled and anhydrous ammonia was bubbled through for 2 minutes to neutralize the catalyst. Upon removal of the xylene under reduced pressure there was obtained 63 grams of a soft wax which was insoluble in water, but soluble in ethanol whereas the original siloxane was insoluble in ethanol.

The foregoing Examples 1 to 3, illustrate, in a series of bis(monomethoxypolyoxyethylene) polydimethylsiloxane block copolymers, wherein the molecular weight of the diol monoether was kept constant and the molecular weight of the siloxane was increased upwards to below 5000, the water-solubility of the block copolymers depends on their oxyethylene content as shown in the table below.

TABLE III

Water solubility of polyoxyethylene-polysiloxane block copolymers

| Block Copolymers | Percent Oxyethylene Content (by wt.) | Water Solubility |
| --- | --- | --- |
| Example I | 61 | Soluble. |
| Example II | 42 | Do. |
| Example III | 27 | Insoluble. |

In general it appears that polyoxyethylene-polysiloxane block copolymers are water-soluble or at least partly water-soluble when their oxyethylene content by weight is at least about 33%.

Alkoxypolyoxyethylene-polysiloxane block copolymers of the water-soluble type described have been found to possess exceptional emulsifying qualities for such systems as benzene-water mixtures, organosilane-water mixtures, silicone oil or polysiloxane-water mixtures, etc. due to the presence of water-soluble groups, i.e., alkoxypolyoxyethylene chains, and groups such as the polysiloxane chains, which have an affinity for such water-insoluble materials as benzene, organosilanes, silicone oil, etc. in the compound molecules. These block copolymers, furthermore, make it possible to prepare aqueous solutions containing polysiloxanes for instance in uses as tire mold release agents and in textile lubricants where it is desired to provide a simple and inexpensive vehicle for these compounds. Moreover, coatings of these compounds are easily removed by washing with water.

The water-insoluble polyoxyethylene-polysiloxane block copolymers are useful as synthetic lubricants and as mold release agents.

ALKOXYPOLYOXY-1,2-PROPYLENE-POLYSILOXANE BLOCK COPOLYMERS

Polyoxy-1,2-propylene diol monoethers may be prepared by the addition of 1,2-propylene oxide to a monohydroxy compound, such as methanol, ethanol, butanol, octanol, benzyl alcohol, butyl and octyl phenol etc. The properties of such an addition product, depending to some degree upon the particular monohydroxy alcohol used as a starting material, are similar to the properties of polyoxy-1,2-propylene glycols of corresponding average molecular weights. The longer the polyoxy-1,2-propylene chain of the polyoxy-1,2-propylene glycol monoether, i.e. the higher its weight, the less appears to be the influence of the starting monohydroxy alcohol on such properties.

Alkoxypolyoxy-1,2-propylene glycol compositions have been prepared in average molecular weights of up to 4000 or 5000 and higher. The average molecular weights of these compositions are normally determined from acetyl values, although other methods of calculation, such as from ebullioscopic data or viscosity data, may be used.

The alkoxypolyoxy-1,2-propylene glycols are normally water-insoluble, viscous liquids which are, nevertheless, soluble in most organic solvents, including alcohols, ketones, toluene and gasoline. Their solubility in petroleum oils used as lubricants is limited at room temperature, but it increases as the temperature is raised with complete miscibility occurring below 200° F. They are most generally useful as lubricants, having good lubricant qualities, e.g. good load carrying properties, and a low rate of change of viscosity with concurrent changes in temperature. These compositions have a relatively low volatility and do not tend to produce sludge while in use.

Polysiloxanes or silicone oils of the type described hereinbefore are viscous oils which, when compared with alkoxypolyoxy 1,2-propylene glycol compositions, have better viscosity temperature characteristics, i.e. a lower rate of change of viscosity with a concurrent change in temperature, lower pour points, and better thermal stabilities. However, they are very poor lubricants by virtue of the fact that they possess little, if any, load carrying capabilities.

The block copolymers of this invention, however, are characterized by properties which distinguish them from their individual components. Thus, at certain silicon contents they have better load-carrying capacity as lubricants than the polyoxyalkylene fluids even though the organo-polysiloxanes, themselves, have little or no load-carrying capacity.

The invention is typified and further illustrated by the following specific examples. The average molecular weights for the alkoxypolyoxy-1,2-propylene glycol compositions set forth in these examples were calculated from acetyl values whereas the average molecular weights for the polysiloxane compositions were determined from charging ratios used in the preparation of said polysiloxane compositions or from cryoscopic values measured in cyclohexane.

EXAMPLE IV

Block copolymer from a dialkoxypolysiloxane (av. M.W. 518) and a monoether of a polypropylene glycol (av. M.W. 352)

In a 500 cubic centimeter flask there were placed 140.8 grams (0.4 mole) of the monobutyl ether of polyoxy-1,2-propylene glycol having an average molecular weight of 352, 103.6 grams (0.2 mole) of a liquid polydimethylsiloxane end-blocked with an average of two methoxy groups per molecule and having an average molecular weight of 518, 2.5 grams of trifluoroacetic acid catalyst and 100 cubic centimeters of xylene. The mixture was heated to reflux temperature (about 120° C.) for 4 hours, during which time 10 grams of methanol were removed at the head of the column along with some solvent. Upon removal of the xylene under reduced pressure there was obtained 230 grams of a water-immiscible oil having a viscosity at 100° F. of 19.7 centistokes. The block copolymer had good metal-to-metal lubricating properties under thin film conditions.

EXAMPLE V

Block copolymer from a dialkoxypolysiloxane (av. M.W. 222) and a monoether of a polypropylene glycol (av. M.W. 625)

In a three-liter flask connected to a fractionating column there were placed 937.5 grams (1.5 moles) of the monobutyl ether of polyoxy-1,2-propylene glycol having an average molecular weight of 625, 166.5 grams of tetramethyldiethoxydisiloxane having an average molecular weight of 222 (0.75 mole), 2.2 grams of trifluoroacetic acid catalyst and 500 cubic centimeters of toluene. The mixture was heated at the reflux temperature of 120° C. for 12 hours during which time ethyl alcohol was removed at the head of the column along with solvent. The reaction mixture was then cooled, 20 grams of sodium bicarbonate added and while stirring the mixture was heated to reflux for 30 minutes to neutralize the catalyst. Upon filtering the solution and removing the toluene under reduced pressure there was obtained as a residue product 1030 grams of a clear water-insoluble oil having a viscosity at 100° F. of 50.0 centistokes.

EXAMPLE VI

*Block copolymer from a dialkoxypolysiloxane (av. M.W. 584) and a monoether of a polypropylene glycol (av. M.W. 625)*

In a two-liter flask connected to a fractionating column there were placed 625 grams (1.0 mole) of the monobutyl ether of polyoxy-1,2-propylene glycol having an average molecular weight of 625, 292 grams (0.5 mole) of a diethoxy-end-blocked polydiethyl siloxane having an average molecular weight of 584, 1.8 grams of trifluoroacetic acid catalyst, and 500 cubic centimeters of toluene. The mixture was heated at the reflux temperature (about 120° C.) for 15 hours during which time a mixture of ethanol and toluene distilling at 78–100° C. was removed from the head of the column. The reaction mixture was then cooled and transferred to a flask equipped with reflux condenser and mechanical stirrer. Solid sodium bicarbonate (10 grams) was added and the mixture was heated at the reflux temperature with stirring for 30 minutes to neutralize the catalyst. After cooling the mixture to room temperature and filtering the solids present, the toluene was stripped under reduced pressure of about 10 millimeters up to 140° C. There was obtained 839 grams of clear polymeric oil having a viscosity of 60.4 centistokes at 100° F. The product contained 8.3% silicon which is in good agreement with the theoretical value of 7.8% Si for a bis(butoxyoxypropylene) polydiethylsiloxane of the theoretical molecular weight resulting from a complete reaction. The copolymer had excellent metal-to-metal lubricating properties. For example, it carried a load of 370 pounds in a standard S.A.E. load test. (Modified CRC Procedure: loading rate 18 lbs./sec. and main shaft speed of 475 revolutions per minute.) Under the same conditions a diethylpolysiloxane fluid of comparable viscosity carried less than 100 pounds load. Also a monobutyl ether of polyoxy-1,2-propylene glycol of comparable viscosity carried a load of only 100 pounds. The latter fluid is considered a good lubricant. It is thus apparent that the copolymer has better lubricity than either of the parent type fluids from which it was prepared.

EXAMPLE VII

*Block copolymer from a dialkoxy polysiloxane (av. M.W. 1036) and a polypropylene glycol monoether (av. M.W. 1000)*

In a one-liter flask connected to a fractionating column there were placed 104 grams of a dimethoxy end-blocked linear polydimethylsiloxane having a molecular weight of 1036 (0.1 mole), 100 grams (0.1 mole) of the monobutyl ether of polyoxy-1,2-propylene glycol having a molecular weight of 1000, 2 grams of potassium dimethylsilanolate (containing 3 wt. percent potassium) and 300 cubic centimeters of xylene. The mixture was heated at the reflux temperature (about 145° C.) for 6 hours during which time 2.1 grams of methyl alcohol was removed from the head of the column. At this point 0.4 gram of n-amyl borate was added to neutralize the catalyst. The reaction mixture was refluxed an additional hour and cooled to room temperature. The mixture was then centrifuged to remove suspended solid material and the solvent distilled under reduced pressure. The residual material consisted of 140 grams of clear oil having a viscosity of 80.5 centistokes at 100° F. This copolymer was useful as a lubricant. It represents a block copolymer of Type III, i.e. it is predominantly composed of one polysiloxane block and one polyoxyalkylene block.

EXAMPLE VIII

*Block copolymer from a dialkoxy polysiloxane (av. M.W. 2220) and a polypropylene glycol monoether (av. M.W. 1000)*

In a 500 cubic centimeter flask connected to a fractionating column were placed 50.0 grams (0.05 mole) of the monobutyl ether of polyoxy-1,2-propylene glycol having an average molecular weight of 1000, 111 grams (.05 mole) of dimethoxy end-blocked linear polydimethylsiloxane having an average molecular weight of 2220, 1.5 grams of potassium dimethyl silanolate catalyst (containing 3 wt. percent potassium) and 200 cubic centimeters of xylene. The mixture was heated to the reflux temperature (about 145° C.) for 6 hours during which time methanol was removed at the head of the column. The solution was cooled and 0.3 gram of n-amyl borate was added to neutralize the catalyst. Upon removal of the solvent under reduced pressure there was obtained 125 grams of a residue product which was a clear oil having a viscosity at 100° F. of 74.1 centistokes. It was representative of a block copolymer of Type III.

EXAMPLE IX

*Block copolymer from a dialkoxy polysiloxane (av. M.W. 6068) and polypropylene glycol monoalkyl ether (av. M.W. 1700)*

In a 500 cubic centimeter flask connected to a fractionating column there were placed 86.7 grams (0.051 mole) of the monobutyl ether of polyoxy-1,2-propylene glycol having an average molecular weight of 1700, 154.5 grams of a diethoxy end-blocked linear polydimethylsiloxane having an average molecular weight of 6068 (0.0255 mole), 0.4 gram of trifluoroacetic acid and 250 cubic centimeters of toluene. The mixture was heated to reflux (about 120° C.) for 4 hours during which time ethanol along with some solvent was removed at the head of the column. The solution was cooled and 0.3 gram of triethanolamine added to neutralize the catalyst. Upon removal of the solvent under reduced pressure there was obtained a viscous liquid having a viscosity at 100° F. of 805 centistokes.

EXAMPLE X

*Block copolymer from a dialkoxy polysiloxane (av. M.W. 8288) and a polypropylene glycol monoalkyl ether (av. M.W. 2230)*

In a two-liter flask there were placed 159 grams (0.072 mole) of the monobutyl ether of polyoxy-1,2-propylene glycol having an average molecular weight of 2230, 253.6 grams (0.0306 mole) of a diethoxy-endblocked linear polydimethylsiloxane having an average molecular weight of 8288, 0.91 gram of trifluoroacetic acid as a catalyst and 1000 cubic centimeters of toluene. The mixture was heated at the reflux temperature (about 120° C.) for 7 hours during which time a low-boiling material containing ethanol was removed at the head of the column. The solution was then cooled and 10 grams of sodium bicarbonate added and the solution refluxed an additional 30 minutes with stirring to neutralize the acid catalyst. The solution was filtered and the toluene removed under reduced pressure. There was obtained as a residue product 395 grams of a clear viscous oil having a viscosity at 25° C. of 17,500 centipoises.

Alkoxypolyoxy-1,2-propylene-polysiloxane block copolymers of the type described have been found to be particularly useful as lubricating oils for such applications as metal-on-metal moving parts. These block copolymers combine excellent load-carrying and lubricating properties with superior viscosity-temperature characteristics, low pour points and the high thermal stabilities to result in a lubricating oil which is superior in most aspects to natural or synthetic lubricants.

ALKOXYPOLYOXYETHYLENE-POLYOXY-1,2-PROPYLENE-POLYSILOXANE BLOCK COPOLYMERS

Alkoxypolyoxyethylene-polyoxy-1,2-propylene glycol compositions may be prepared by the addition of a mixture of alkylene oxides containing ethylene oxide and 1,2-propylene oxide to a monohydroxy aliphatic alcohol, as a starting material. The resulting addition products are mixtures of monohydroxy polyoxyalkylene aliphatic monoethers having polyoxyalkylene chains of different lengths with a hydroxyl group appearing at one end of each chain and the aliphatic radical from the starting alcohol at the other end and containing, in a single molecule, both the oxyethylene group and the oxy 1,2-propylene group.

Alkoxypolyoxyethylene-polyoxy 1,2-propylene glycol compositions (i.e. monohydroxy polyoxyethylene-polyoxy 1,2-propylene monoether mixtures) are obtainable in average molecular weights of up to 5000 and higher. They may be obtained as normally liquid products which are characterized by having relatively low rates of change of viscosity with concurrent change in temperature; the actual viscosity, as well as other properties, of the product being dependent upon the starting alcohol, the ratio of ethylene oxide to 1,2-propylene oxide in the alkylene oxide mixture, and the average molecular weight of the product.

The ratio of ethylene oxide to 1,2-propylene oxide in the alkylene oxide mixture used in preparing these addition products may be varied to produce monohydroxy polyoxyethylene-polyoxy-1,2-propylene monoethers having diverse properties. By way of illustration, an addition product prepared from an alkylene oxide mixture containing a higher proportion of ethylene oxide than 1,2-propylene oxide exhibits a substantially greater degree of miscibility with water, or a greater water tolerance, than addition products prepared from alkylene oxide mixtures having a preponderance of 1,2-propylene oxide. Viscosity-temperature characteristics are also affected by the particular composition of the alkylene oxide mixture as are the solidification temperatures of the addition products.

Addition products prepared from alkylene oxide mixtures containing equal proportions by weight of ethylene oxide and 1,2-propylene oxide, for example, exhibit some of the lowest rates of change of viscosity with change in temperature and are characterized by the very useful property of remaining in the fluid state at very low temperatures for instance as low as −50° C., and lower. They possess the unusual feature of being quite miscible in cold water but relatively immiscible in hot water.

Alkoxypolyoxyethylene-polyoxy-1,2-propylene glycol compositions, possess good lubricating qualities. They are only slightly hygroscopic and dissolve in most organic solvents, such as alcohols, acetone and benzene but their solubility in aliphatic hydrocarbons is low.

For a detailed description of alkoxypolyoxyethylene-polyoxy 1,2-propylene glycol compositions and their preparation reference is made to United States Patent No. 2,425,755, issued August 19, 1947, to F. H. Roberts and H. R. Fife.

The block copolymers of this invention may be obtained having a combination of properties which are determined by the presence of both alkoxypolyoxyethylene-polyoxy 1,2-propylene chains and polysiloxane chains. Moreover, the lengths and numbers of these chains may be adjusted so as to provide block copolymers in which either the alkoxypolyoxyalkylene chains or the polysiloxane chains are predominant. These organo-silicone compounds range in physical state from viscous oils to gummy solids, depending upon the relative chain lengths of the constituent chains.

The water-solubility characteristics of these block copolymers depend upon the water-solubility properties of the alkoxypolyoxyethylene-polyoxy-1,2-propylene chains contained by the molecules of the copolymers and the relative size and number of said chains when compared with the polysiloxane chains. Compounds containing the water-insoluble type of alkoxypolyoxyalkylene chain are water-insoluble. Block copolymers having that fraction by weight of their composition which is attributable to the oxyethylene groups approximately equal to or greater than those fractions which are attributable to either the polysiloxane units or the oxypropylene units are water-soluble. Those block copolymers wherein the mole fraction of oxyethylene groups is greater than one-half the sum of the mole fractions of oxypropylene groups and siloxane groups are at least partially soluble in water.

The following table illustrates the effect found to be exerted on the water-solubility of the block copolymers of this invention by the size and type of the predominant component of the compound molecules. The compounds represented on this table were prepared by condensing diethoxy polydimethylsiloxane with monohydroxy polyoxyalkylene butyl ether, containing 50 percent by weight oxyethylene units and 50 percent by weight of oxy-1,2-propylene units in a molar ratio of one mole of the polysiloxane to two of the polyoxyalkylene ether.

TABLE IV

| Average Molecular Weight of Dimethylpolysiloxane | Average Molecular Weight of Monohydroxy Polyoxyalkylene Butyl Ether | Percent Oxyethylene Groups in Block Copolymers | | Water Solubility of Organo-Silicone Product |
|---|---|---|---|---|
| | | By Wt. | By Moles | |
| 1,036 | 1,550 | 36.1 | 46.5 | Soluble. |
| 2,146 | 1,550 | 28.3 | 36.7 | Partly soluble. |
| 6,068 | 3,500 | 26.2 | 35.8 | Insoluble. |

The following examples typify and further illustrate this invention. The average molecular weights of the alkoxypolyoxyethylene-polyoxy-1,2-propylene glycol compositions used in these examples are those determined from acetyl values and the average molecular weights of the alkoxy polysiloxane compounds set forth are those determined from charging ratios used in the preparation of the polysiloxane compounds from cryoscopic measurements of the polysiloxane compounds in cyclohexane.

EXAMPLE XI

*Block copolymer from a dialkoxy polysiloxane (av. M.W. 1034) and a polyoxyethylene-oxypropylene monoalkyl ether (av. M.W. 1550)*

About 65 pounds of mixed cyclic dimethyl polysiloxanes, 10.8 pounds of dimethyldiethoxy silane and 17.2 grams of powdered potassium hydroxide were charged to a 30 gallon reactor kettle. The agitator was turned on and the temperature raised to 150° C. and held there for 3 hours after which time the pressure was reduced to 2 inches of mercury at 125.150° C. About 12–15% of the contents were distilled as light fractions. The product was filtered, and had a molecular weight of 1000 measured cryoscopically in cyclohexane. The ethoxy content of this product was measured to be 8.7 percent by weight from which the molecular weight calculates to be 1034 as compared to the theoretical value of 9.0% for a diethoxy end-blocked polydimethylsiloxane of the measured molecular weight of 1000.

About 72.0 pounds (.0464 lb./mole) of butoxy polyoxyalkylene glycol, containing 50 percent by weight of oxyethylene units and 50 percent by weight of oxy-1,2-propylene units and having an average molecular weight of 1550, and 88.4 pounds of toluene were charged into a reactor kettle and refluxed through a trap until no further water could be separated. Then 24.1 pounds (.0233 lb./mole) of the ethoxy end-blocked dimethylpolysiloxane prepared above having an average molecular weight of 1034 (by ethoxy analysis) and 93.4 grams of trifluoroacetic acid were added and deflux was established through the attached fractionating column. An ethyl alcohol-toluene azeotrope containing the theoretical amount (0.0464 lb./mole) of ethyl alcohol was removed from the head of the column. Then the reaction mixture was cooled to 100° C. and 280 grams of sodium bicarbonate was added to neutralize the catalyst. Reflux was re-established for 30 minutes after which the contents were sparged with nitrogen and the toluene was stripped off. The product was filtered to remove the neutralization residues after which it remained non-turbid with a yellow color. The amount of product was 90 pounds which is about a 95 percent yield. The product was water-soluble and had a viscosity of 700 centistokes at 25° C. The elemental analysis produced the following results:

|  | Percent by Weight | |
|---|---|---|
|  | Measured | Theoretical |
| Carbon | 52.6 | 52.0 |
| Hydrogen | 9.1 | 9.4 |
| Silicon | 8.0 | 8.8 |

This product is useful for releasing rubber from molds.

EXAMPLE XII

*Block copolymer from a dialkoxy polysiloxane (av. M.W. 2220) and a polyoxyethylene-oxypropylene monoalkyl ether (av. M.W. 850)*

In a one-liter flask fitted with a fractionating column there were placed 47.5 grams (0.055 mol) of the monobutyl ether of a polyoxyalkylene glycol containing 50 wt. percent propylene oxide units and 50 wt. percent ethylene oxide groups and having an average molecular weight of 850, 111.0 grams (0.05 mole) of dimethoxy-endblocked dimethylpolysiloxane having an average molecular weight of 2220, 1.0 gram of potassium dimethylsilanolate (containing 3.0 wt. percent potassium) catalyst and 350 cubic centimeters of xylene. The mixture was heated to the reflux temperature of about 145° C. for 3 hours, during which time methanol was removed along with some solvent at the head of the column. The mixture was then cooled and 0.2 gram of n-amyl borate added to neutralize the catalyst. The solution was then refluxed for an additional hour. Upon removal of the xylene solvent under reduced pressure there were obtained 124 grams of a clear liquid product having a viscosity at 100° F. of 101.6 centistokes.

The molar ratio of the polyoxyalkylene glycol monoether to polysiloxane used in this example was slightly greater than 1. The number of moles of methanol removed from the reaction mixture approximately equalled the number of moles of polyoxyalkylene glycol monoether present in the initial reaction mixture, thus indicating that the reaction proceeded to give a copolymer of type III and that the molecules of the resulting product were predominantly composed of one polyoxyalkylene glycol monoether chain connected to one polysiloxane chain.

In the following examples, the molar ratios of the polyoxyalkylene glycol monoether compositions to the dialkoxy polysiloxane compounds used in the initial reaction mixtures were in all but one case (Example XIX) equal to 2. The number of moles of alkanol removed from the reaction mixture of each example was found to approximately correspond with twice the number of moles of the dialkoxy polysiloxane initially charged into the reaction mixture, thereby indicating that the reactions proceeded in a manner to give a block copolymer of type I and that two moles of the polyoxyalkylene aliphatic monoether reacted with each mole of the polysiloxane compounds resulting in a product having molecules constituted by two polyoxyalkylene glycol monoether chains connected to one polysiloxane chain.

EXAMPLE XIII

*Block copolymer from a dialkoxy polysiloxane (av. M.W. 1204) and a polyoxyethylene-oxypropylene monoalkyl ether (av. M.W. 1550)*

In a 500 cubic centimeter flask connected to a fractionating column there were placed 155 grams (0.1 mole) of the monobutyl ether of a polyoxyalkylene glycol containing 50 wt. percent ethylene oxide units and 50 wt. percent propylene oxide units and having an average molecular weight of 1550, 60.2 grams (0.05 mole) of a diethoxy-endblocked polydimethylsiloxanepolydiethylsiloxane compound (containing 55 wt. percent diethyl and 45 wt. percent dimethyl siloxane) having an average molecular weight of 1204, 0.43 gram of trifluoroacetic acid catalyst and 200 cubic centimeters of toluene. This mixture was heated at the reflux temperature of about 120° C. for 6 hours during which time 4.4 grams (0.096 mole) of ethyl alcohol were removed from the head of the column along with a small amount of toluene. At this point 10 grams of solid sodium bicarbonate was added to neutralize the catalyst. The reaction mixture was heated at reflux for 30 minutes, cooled to room temperature and filtered. Upon distillation of the toluene solvent, there were obtained as a product 205 grams of clear, water-soluble oil having a viscosity at 25° C. of 794 centistokes. The product was a good emulsifier for toluene and water.

EXAMPLE XIV

*Block copolymer from a dialkoxy polysiloxane (av. M.W. 1408) and a polyoxyethylene-oxypropylene monoalkyl ether (av. M.W. 1550)*

In a 500 cubic centimeter flask connected to a fractionating column, were placed 155 grams (0.1 mole) of the monobutyl ether of a polyoxyalkylene glycol consisting of 50 wt. percent ethylene oxide and 50 wt. percent propylene oxide units and having an average molecular weight of 1550, 70.4 grams (0.05 mole) of diethoxy-endblocked polyphenylmethylsiloxane-polydimethylsiloxane compound containing 62 wt. percent phenylmethylpolysiloxane and having an average molecular weight of 1408, 0.45 gram of trifluoroacetic acid and 200 cubic centimeters of toluene. The mixture was heated at the reflux temperature (about 120° C.) for 5 hours during which time 4.6 grams (0.1 mole) of ethyl alcohol was removed from the head of the column along with a small amount of toluene. About 10 grams of solid sodium bicarbonate was added to neutralize the catalyst. The reaction mixture was heated at reflux for 30 minutes, cooled to room temperature and filtered. Upon distillation of the toluene solvent under reduced pressure, there were obtained as a product 220 grams of water-soluble oil having a viscosity of 1030 centistokes at 25° C. The product was found to readily emulsify toluene-water mixtures.

EXAMPLE XV

*Block copolymer from a dialkoxy polysiloxane (av. M.W. 1632) and a polyoxyethylene-oxypropylene monoalkyl ether (av. M.W. 1550)*

In a one-liter flask connected to a fractionating column there were placed 155 grams (0.1 mole) of the monobutyl ether of a polyoxyalkylene glycol containing 50 wt. percent of ethylene oxide and 50 wt. percent of propylene oxide and having an average molecular weight of 1550, 81.6 grams (0.05 mole) of diethoxy-endblocked polydiphenylsiloxane-polydimethylsiloxane compound containing 76 wt. percent polydiphenylsiloxane units and having an average molecular weight of 1632, 0.47 gram of trifluoroacetic acid, and 450 grams of toluene solvent. The mixture was heated at the reflux temperature of 120° C. for about 6 hours during which time 4.8 grams (0.1 mole) of ethyl alcohol was removed from the head of the column. About 10 grams of solid sodium bicarbonate was then added to neutralize the catalyst and the reaction mixture was heated at reflux for 30 minutes. After cooling the mixture to room temperature, filtering the solid salts present and removing the toluene solvent under reduced pressure there was obtained as a residue product a homogeneous oil having a viscosity of 462 centistokes at 25° C. The oil formed was miscible with water in all properties at room temperature with only a slight haze observable. It was also soluble in ethyl alcohol. It was a fair emulsifier for toluene-water mixtures. A mixture of the starting materials was not miscible with water or alcohol and had little or no emulsifying properties.

Example XVI

*Block copolymer from a dialkoxy polysiloxane (av. M.W. 1904) and a polyoxyethylene-oxypropylene monoalkyl ether (av. M.W. 1550)*

In a 500 cubic centimeter flask attached to a fractionating column there were placed 93 grams (0.06 mole) of the monobutylether of a polyoxyalkylene glycol containing 50 wt. percent ethylene oxide and 50 wt. percent propylene oxide and having an average molecular weight of 1550, 57.1 grams (0.03 mole) of diethoxy-endblocked polyphenylmethylsiloxane having an average molecular weight of 1904, 0.3 gram of trifluoroacetic acid and 200 cubic centimeters of toluene. The mixture was heated at the reflux temperature of about 120° C. for 6 hours during which time a low-boiling material containing ethyl alcohol was taken off at the head of the column and the head temperature became constant at 106–108° C. At this point the solution was cooled and transferred to a three-necked flask equipped with mechanical stirrer and reflux condenser. An excess of solid sodium bicarbonate (about 10 grams) was added to neutralize the catalyst and the solution was refluxed for 30 minutes with stirring. After cooling the reaction mixture, filtering off the solid material and removing toluene solvent under reduced pressure, there was obtained a residue product of 150 grams of water-soluble oil having a viscosity of 960 centistokes at 25° C. The product was a good emulsifier for toluene-water mixtures.

Example XVII

*Block copolymer from a dialkoxy polysiloxane (av. M.W. 16,000) and a polyoxyethylene-oxypropylene monoalkyl ether (av. M.W. 3500)*

In a 500 cubic centimeter flask attached to a fractionating column were placed 35.0 grams (0.01 mol) of the monobutyl ether of a polyoxyalkylene glycol containing 50 wt. percent ethylene oxide and 50 wt. percent propylene oxide units and having an average molecular weight of 3500, 80.0 grams (0.005 mole) of diethoxy-endblocked polydimethylsiloxane having an average molecular weight of 16,000, 0.2 gram of trifluoroacetic acid catalyst and 250 cubic centimeters xylene. The mixture was heated to the reflux temperature of about 145° C. for 5 hours during which time ethyl alcohol was removed at the head of the column along with solvent. The solution was then cooled and anhydrous ammonia bubbled through for 2 minutes to neutralize the catalyst. Upon removal of the solvent under reduced pressure there were obtained 105 grams of a soft solid product which was insoluble in water. Alcohol solutions of this product were completely miscible with water, whereas the siloxane starting material was insoluble both in alcohol and water and in mixtures thereof. The product was useful as a mold release agent.

Example XVIII

*Block copolymer from a dialkoxypolysiloxane (av. M.W. 1036) and a polyoxyethylene-oxypropylene monoalkyl ether (av. M.W. 500)*

In a 3-liter flask attached to a fractionating column there were placed 500 grams (1.0 mole) of the monomethyl ether of a polyoxyalkylene glycol containing 66% by weight ethylene oxide and 34% by weight propylene oxide units and having an average molecular weight of 500, 518 grams (0.5 mole) of diethoxy-endblocked polydimethylsiloxane having an average molecular weight of 1036, 2.0 grams of trifluoroacetic acid catalyst and 750 cubic centimeters of toluene. The mixture was heated at the reflux temperature of about 120° C. for 6 hours during which time 46.0 grams (1.0 mole) of ethanol was removed at the head of the column along with some solvent. An additional 30 minutes' refluxing in the presence of 10 grams of sodium bicarbonate was carried out to neutralize the acid catalyst. After filtering the solution and removing the solvent under reduced pressure there was obtained 925 grams of a clear viscous oil containing 17.2% Si as compared to the theoretical value of 18.4%.

Example XIX

*Block copolymer of polyoxyethylene-oxypropylene monoalkyl ether (av. M.W. 1550) and polydimethylsiloxane containing one ethoxy group per polymer molecule (av. M.W. 1006)*

In a 500-cc. flask there were placed 77.5 grams (0.05 mole) of the monobutyl ether of a polyoxyalkylene glycol containing 50 wt. percent ethylene oxide and 50 wt. percent propylene oxide units (average molecular weight 1550), 50.3 grams (0.05 mole) of a polydimethylsiloxane containing an average of one trimethylsiloxy end group and one ethoxy end group per polymer molecule (average molecular weight 1006), 0.25 gram of trifluoroacetic acid catalyst and 200 cc. of toluene. The mixture was heated at the reflux temperature for 5 hours during which time 2.4 grams of ethanol were removed from the head of the column. The solution was then transferred to a flask equipped with a mechanical stirrer and reflux condenser. Solid sodium bicarbonate was added to neutralize the catalyst and the mixture was heated at reflux with stirring for 30 minutes. After cooling to room temperature, filtering the solid material present and desolvating under reduced pressure there were obtained 110 grams of a cloudy viscous oil which formed a cloudy solution in water. It is representative of a block copolymer of type III.

The alkoxypolyoxyethylene-polyoxy-1,2-propylene polysiloxane block coplymers of the type described are of the water-soluble or water-insoluble varieties depending upon the molecular composition and size of the particular alkoxypolyoxyalkylene chain or chains contained in the copolymers. Those copolymers which are not completely soluble in water can be dissolved in aqueous solutions containing alcohols. Aqueous solutions of these compounds are extremely useful as rubber mold release agents and as lubricants in general, and are especially useful in applications where the use of inflammable solvents is undesirable.

What is claimed is:

1. A composition of matter comprising a mixture of block copolymers wherein such copolymer contains from one to two siloxane polymers and from one to two oxyalkylene polymers in combination, each siloxane polymer being composed of at least two silicon atoms, each having two silicon-bonded monovalent hydrocarbon groups, joined through oxysilicon bonds and bonded at one end to one oxyalkylene polymer and at the other end to a member from the class consisting of a monovalent hydrocarbon group and the second oxyalkylene polymer through carbon-oxy-silicon bond, and each oxyalkylene polymer being composed of at least five oxyalkylene groups joined to each other by oxycarbon bonds and bonded at one end to one siloxane polymer through a carbon-oxy-silicon bond and at the other end to a group from the class consisting of monovalent hydrocarbonoxy group through an oxycarbon bond and the second siloxane polymer through a carbon-oxy-silicon bond.

2. A composition of matter comprising a mixture of block copolymers wherein such copolymers contain at least one siloxane polymer and at least one oxyalkylene polymer in combination and have the general formula:

$$R'[(R_2SiO)_y]_a[(C_nH_{2n}O)_x]_bR''$$

wherein R is a monovalent hydrocarbon group, R' and R'' are radicals from the group consisting of monovalent hydrocarbon and monovalent hydrocarbonoxy groups, $n$ is an integer from 2 to 4, $y$ is an integer being at least 2, $x$ is an integer being at least 5, and $a$ and $b$ are integers whose sum is 2 to 3.

3. A composition of matter comprising a mixture of block copolymers wherein such copolymers contain one siloxane polymer and two oxyalkylene polymers in combination and have the general formula:

$$R'O(C_nH_{2n}O)_x(R_2SiO)_y(C_nH_{2n}O)_xR''$$

wherein R, R' and R'' are monovalent hydrocarbon radicals, $n$ is an integer from 2 to 4, $y$ is an integer being at least 2, and $x$ is an integer being at least 5.

4. A composition of matter comprising a mixture of block copolymers wherein such copolymers contain two siloxane polymers and one oxyalkylene polymer in combination and have the general formula:

$$R'(R_2SiO)_y(C_nH_{2n}O)_x(R_2SiO)_{y-1}R_2SiR''$$

where R is a monovalent hydrocarbon group, R' and R'' are radicals from the group consisting of monovalent hydrocarbon and monovalent hydrocarbonoxy groups, $n$ is an integer from 2 to 4, $y$ is an integer being at least 2, and $x$ is an integer being at least 5.

5. A composition of matter as claimed in claim 1 in which the siloxane polymer comprises from 5% to 95% by weight of the block copolymer.

6. A composition of matter as claimed in claim 1 in which the siloxane polymer comprises from 5% to 15% by weight of the block copolymer.

7. A composition of matter as claimed in claim 1 in which the siloxane polymer comprises from 20% to 50% by weight of the block copolymer.

8. A composition of matter as claimed in claim 1 in which the elemental silicon content is from 2% to 20% by weight of the copolymer.

9. A composition of matter as claimed in claim 2 in which the monovalent hydrocarbon radical R is selected from the group consisting of methyl, ethyl and phenyl.

10. A composition of matter as claimed in claim 3 in which the monovalent hydrocarbon radical R is selected from the group consisting of methyl, ethyl and phenyl.

11. A composition of matter as claimed in claim 4 in which the monovalent hydrocarbon radical R is selected from the group consisting of methyl, ethyl and phenyl.

12. A composition of matter comprising a mixture of block copolymers wherein such copolymers contain one siloxane polymer and two oxyalkylene polymers in combination and have the general formula:

$$R'O(C_2H_4O)_x(R_2SiO)_y(C_2H_4O)_xR''$$

wherein R, R' and R'' are monovalent hydrocarbon radicals, $y$ is an integer which is at least 4 and $x$ is an integer which is at least 5.

13. A composition of matter as claimed in claim 12 in which the oxyethylene content of the block copolymer is at least about 33% by weight.

14. A composition of matter as claimed in claim 12 in which R is a monovalent hydrocarbon radical of the group consisting of methyl, ethyl and phenyl.

15. A composition of matter comprising a mixture of block copolymers wherein such copolymers contain one siloxane polymer and two oxyalkylene polymers in combination and have the general formula:

$$R'O(C_3H_6O)_x(R_2SiO)_y(C_3H_6O)_xR''$$

wherein R, R' and R'' are monovalent hydrocarbon radicals, $y$ is an integer which is at least 4 and $x$ is an integer which is at least 5.

16. A composition of matter as claimed in claim 15 in which R is a monovalent hydrocarbon radical of the group consisting of methyl, ethyl and phenyl.

17. A composition of matter comprising a mixture of block copolymers wherein such copolymers contain one siloxane polymer and two oxyalkylene polymers in combination and have the general formula:

$$R'O[(C_2H_4O)_b(C_3H_6O)_c](R_2SiO)_y[(C_2H_4O)_b(C_3H_6O)_c]R''$$

wherein R, R' and R'' are monovalent hydrocarbon radicals, $y$ is an integer which is at least 4, and $b$ and $c$ are integers whose sum is at least 5.

18. A composition of matter as claimed in claim 17 in which R is a monovalent hydrocarbon radical of the group consisting of methyl, ethyl and phenyl.

19. A composition of matter as claimed in claim 17 in which the values of $b$, $c$ and $y$ are such that the ratio $$\frac{2b}{2c+y}$$

is at least equal to about 0.50.

20. A method of preparing a block copolymer containing at least one siloxane polymer and at least one oxyalkylene polymer in combination, which comprises heating a siloxane polymer containing two monovalent hydrocarbon groups bonded to each silicon atom and at least one alkoxy group attached to silicon and a polyoxyalkylene hydroxyl polymer composed of at least five oxyalkylene groups, and removing an alkanol corresponding to said alkoxy group from the reaction mixture.

21. Method of preparing a block copolymer containing one siloxane polymer and two oxyalkylene polymers in combination, which comprises heating a linear dialkoxy-endblocked siloxane polymer having two monovalent hydrocarbon groups bonded to each silicon atom with a monohydroxyl polyoxyalkylene monoalkyl ether polymer composed of at least five oxyalkylene groups, and removing an alkanol corresponding to said alkoxy groups from the reaction mixture.

22. Method of preparing a block copolymer containing two siloxane polymers and one oxyalkylene polymer in combination which comprises heating a linear monoalkoxy endblocked siloxane polymer having two monovalent hydrocarbon groups bonded to each silicon atom with a polyoxyalkylene diol polymer composed of at least five oxyalkylene groups, and removing an alkanol corresponding to said alkoxy groups from the reaction mixture.

23. Method of preparing a block copolymer containing one siloxane polymer and one oxyalkylene polymer in combination which comprises heating a linear monoalkoxy endblocked siloxane polymer having two monovalent hydrocarbon groups bonded to each silicon atom with a monohydroxyl polyoxyalkylene monoalkyl ether polymer composed of at least five oxyalkylene groups, and removing an alkanol corresponding to said alkoxy groups from the reaction mixture.

24. A method of preparing a block copolymer containing at least one siloxane polymer and at least one oxyalkylene polymer in combination, which comprises heating a siloxane polymer containing two monovalent hydrocarbon groups bonded to each silicon atom and at least one alkoxyl group attached to silicon and a polyoxyalkylene hydroxyl polymer composed of at least five oxyalkylene groups in the presence of a mutual solvent and a catalyst, and removing an alkanol corresponding to said alkoxy group from the reaction mixture.

25. Method as claimed in claim 24 in which the catalyst is a potassium silanolate catalyst.

26. Method as claimed in claim 24 in which the catalyst is an acidic catalyst.

27. Method as claimed in claim 24 in which the catalyst is trifluoroacetic acid.

28. Method as claimed in claim 24 in which the catalyst is perfluorobutyric acid.

29. Method as claimed in claim 24 in which the catalyst is perfluoroglutaric acid.

30. Method as claimed in claim 24 in which the catalyst is monochloroacetic acid.

References Cited in the file of this patent

UNITED STATES PATENTS

| | | |
|---|---|---|
| 2,386,793 | Hanford | Oct. 16, 1945 |
| 2,476,307 | Klein | July 19, 1949 |
| 2,529,956 | Myles et al. | Nov. 14, 1950 |
| 2,559,342 | Burkhard | July 3, 1951 |